United States Patent
Williams

(10) Patent No.: US 8,937,871 B2
(45) Date of Patent: *Jan. 20, 2015

(54) COMMUNICATION SYSTEM

(75) Inventor: Philip M Williams, Ipswich (GB)

(73) Assignee: British Telecommunications plc, London (GB)

( * ) Notice: Subject to any disclaimer, the term of this patent is extended or adjusted under 35 U.S.C. 154(b) by 1311 days.

This patent is subject to a terminal disclaimer.

(21) Appl. No.: 11/914,255

(22) PCT Filed: May 12, 2006

(86) PCT No.: PCT/GB2006/001745

§ 371 (c)(1),
(2), (4) Date: Nov. 13, 2007

(87) PCT Pub. No.: WO2006/120462

PCT Pub. Date: Nov. 16, 2006

(65) Prior Publication Data

US 2008/0192628 A1    Aug. 14, 2008

(30) Foreign Application Priority Data

May 13, 2005  (EP) .................................. 05252963

(51) Int. Cl.
  *H04L 12/28*  (2006.01)
  *H04L 12/801*  (2013.01)
  *H04L 12/54*  (2013.01)

(52) U.S. Cl.
  CPC ............ *H04L 47/29* (2013.01); *H04L 12/5602* (2013.01)
  USPC ......................................... 370/252; 370/229

(58) Field of Classification Search
  USPC .................................................. 370/229–238
  See application file for complete search history.

(56) References Cited

U.S. PATENT DOCUMENTS

| 5,367,523 | A |   | 11/1994 | Chang et al. |
|---|---|---|---|---|
| 5,425,086 | A |   | 6/1995 | Hidaka et al. |
| 5,488,609 | A |   | 1/1996 | Hluchyj et al. |
| 5,933,481 | A |   | 8/1999 | MacDonald |
| 6,097,697 | A |   | 8/2000 | Yao et al. |
| 6,118,791 | A | * | 9/2000 | Fichou et al. ................. 370/468 |
| 6,304,551 | B1 |   | 10/2001 | Ramamurthy et al. |

(Continued)

FOREIGN PATENT DOCUMENTS

| EP | 0 386 607 | 9/1990 |
|---|---|---|
| EP | 0 576 122 | 12/1993 |

(Continued)

OTHER PUBLICATIONS

Extended European Search Report dated Oct. 5, 2005 in EP 05252976.

(Continued)

*Primary Examiner* — Steven H Nguyen
(74) *Attorney, Agent, or Firm* — Nixon & Vanderhye PC

(57) ABSTRACT

A controller controls the admit rate of messages passed to a node in a communications system according to a control value that controls the maximum average admit rate. The controller periodically updates the control value in which the updated control value is the lesser of an increasing function of the previous control value; and an increasing function of the previous admit rate. The updated control value is the lesser of an increasing function of the previous control value and the time period since the previous update; and an increasing function of the previous admit rate.

22 Claims, 13 Drawing Sheets

(56) References Cited

U.S. PATENT DOCUMENTS

| | | | |
|---|---|---|---|
| 6,330,313 B1 * | 12/2001 | Hunt | 379/133 |
| 6,363,052 B1 | 3/2002 | Hosein | |
| 6,483,805 B1 | 11/2002 | Davies et al. | |
| 6,650,619 B1 | 11/2003 | Schuster et al. | |
| 6,857,025 B1 | 2/2005 | Maruyama et al. | |
| 2003/0053415 A1 * | 3/2003 | Balakrishnan et al. | 370/229 |
| 2004/0071086 A1 | 4/2004 | Haumont et al. | |

FOREIGN PATENT DOCUMENTS

| | | |
|---|---|---|
| EP | 0 608 981 | 8/1994 |
| EP | 1 017 203 | 7/2000 |
| EP | 1 311 132 | 5/2003 |
| GB | 2 375 002 | 10/2002 |
| WO | 95/14341 | 5/1995 |

OTHER PUBLICATIONS

Extended European Search Report dated Sep. 28, 2005 in EP 05252963.

International Search Report mailed Jun. 22, 2006.

Andersson, G., "Telekomindustrin Tar Befalet Over IP-Telefoni", Elektroniktidningen, 2 pages, (Apr. 29, 2005) including an English Translation (2 pages).

Whitehead, M. J. et al.; "Adaptive Network Overload Controls", BT Technology Journal, vol. 20, No. 3, pp. 31-54, (Jul. 2002).

Kihl, M., "Investigation of Overload Control Algorithms for SCPs in the Intelligent Network", IEE Proc-Commun., vol. 144, No. 6, pp. 419-424, (Dec. 1997).

Tarle, H., "Network Traffic Management (NTM) Using AXE and TMOS Systems", 8039 Ericsson Review, 71, No. 4, pp. 172-189, (1994), Stockholm, SE.

Williams, P. M. et al., "Realising Effective Intelligent Network Overload Controls", BT Technology Journal, vol. 20, No. 3, pp. 55-75, (Jul. 2002).

* cited by examiner

COMMUNICATION SYSTEM

BACKGROUND

1. Related Applications

This application is the U.S. national phase of International Application No. PCT/GB2006/001745 filed 12 May 2006, which designated the U.S. and claims priority to EP 0525963.3 filed 13 May 2005, the entire contents of which are hereby incorporated by reference.

This application is related to co-pending and commonly owned application Ser. No. 11/914,259 filed Nov. 13, 2007 now U.S. Pat. No. 7,933,200 issued Apr. 26, 2011).

2. Technical Field

The present invention relates to the field of communication systems in general and to the control of traffic in communications systems in particular.

3. Related Art

Network overloads can seriously degrade the quality or availability of telecommunications services if they are not effectively controlled. There is a need for effective, automatic controls to protect a range of service platforms from demand levels that are becoming increasingly volatile and unpredictable.

In telephone networks overloads can be caused by the following (either singly or in combination):

media-stimulated mass calling events—such as televotes, charity appeals, competitions and marketing campaigns,
emergencies,
network equipment failures,
auto-scheduled calling, In the absence of effective overload controls, such overloads would threaten the stability of network systems and cause a severe reduction in successful call completions. Ultimately, systems would fail due to lost tasks and services would not be available to customers.

A network operator could not economically provide sufficient capacity to manage the kind of calling rate peaks that can occur. Moreover in an overload, most service requests cannot be terminated successfully because the terminating lines are busy. Therefore overload controls are needed to manage peaks.

An example of this phenomenon is where TV set-top boxes simultaneously start (e.g. at 2 am) to dial-up a server on the internet in order to upload or download customer data. The problem is that there are typically only sufficient terminating lines to handle a small fraction of the calls offered per unit of time; and the instantaneous peak demand may exceed available signalling or processing capacity. One challenging feature of such auto-scheduled events is that the boxes can all follow exactly the same call-script, so that—after failure to establish a first call attempt—all the set-top boxes then follow exactly the same repeat sequence, with identical inter-repeat delays.

For any specific network context, the number of nodes causing a resource to be overloaded can vary widely from one event to another. The conclusion is that in many contexts an effective overload control must be able to cope automatically with variation in the way that traffic is distributed over the overload sources, which may change from one event to another or even during an event.

In a network, different instances of a particular type of resource may have (by design) widely different capacities. ISUP ACC could be used, for example, to protect end nodes (of relatively low capacity) as well as transit nodes (of larger capacity). Furthermore, an individual target resource's capacity in service requests/sec can vary over time. A good control should therefore be able to adjust to cope automatically with such variations in target capacity.

In most network systems call processing is divided among several different sets of processing resources. For example, in telephone switches, it is often divided between peripheral processors which handle sets of traffic routes and a pool of load-balanced central processors which handles call routing, charging, etc. Consequently, it is possible that different sets of processing resources could become the bottleneck as call mixes and the patterns of call flow through the system vary. The system's internal load control therefore needs to reject calls in order to keep response times low and to guarantee correct call handling whatever internal processing resource is overloaded.

For a specific mix of offered demand, the typical throughput curve for a network system is shown in FIG. 1. The resource could be a telephone switch, a Service Control Point (SCP), a Signalling Transfer Point (STP), an ATM node, a World Wide Web server etc.

The exact shape of the admission rate curve will depend on which internal processing resources are the bottleneck for the offered demand mix. However, generally, as the offered request rate increases, there will come a point where the resource invokes its internal overload control to reject some part of the offered load in order to limit the admitted load and consequent delay at the bottlenecked processing resource. At this point therefore the admitted rate will begin to fall below the offered rate and eventually reach a maximum admitted rate (since rejecting service requests consumes processing effort) at some definite offered rate (denoted by $L_M$ in FIG. 1).

Further increasing the offered rate causes the admitted rate to actually fall. Eventually there comes a rate (denoted by $L_C$ service requests/second) where correct call handling cannot be guaranteed and all calls are rejected. This can occur, for example, in telephony switches if internal task queues overflow and the switch may have to restart or roll back to restore itself to a 'sane' state. To restore the resource to normal working, the offered rate will need to be reduced to a level at which the resource is no longer in overload.

In addition—as is illustrated in FIG. 1—the response time of the target resource to a request will start to increase as internal congestion builds up. This response time can be kept to an acceptably low (and roughly constant) level for a certain range of offered rates by means of the target's admission control reducing the rate at which calls are accepted for full processing. Eventually, however, the processing effort of rejecting or discarding calls can itself exhaust the processing capacity available to reject calls (this occurs when the offered load is $L_C$). At that point response times can start to climb rapidly and uncontrollably, triggering high rates of customer abandons and reattempts.

It is important to maximise the target's admitted rate—subject to keeping response times small enough—in order to minimise customer reattempts. This also avoids the sources over-throttling the request streams destined for the target, which would generate unnecessary customer repeat attempts.

For any specific network context, the number of nodes causing a resource to be overloaded can vary widely from one event to another. Furthermore, an individual target resource's capacity in service requests/second can vary over time.

The original idea of 'Intelligent Networks' was to be able to define a system capability that would support the rapid building and deployment of a large range of new services into a telephony network. Services include those with advanced call distribution features, such as call queuing. The ITU-T specifies a series of recommendations that define such a capability, incorporating the INAP (Intelligent Network Application Protocol, [3]). A BT Technical Journal special edition on network intelligence provides an overview of Intelligent Networks, standards and services [1].

Although overloads can occur simply because insufficient capacity has been provided for the demand expected, it is more common for overloads to be caused by some quickly arising event, which may be unanticipated. These include network or system failures, tariff changes and network system processes that have been scheduled to occur synchronously. They also include the type of services deployed on an IN, such as media stimulated events or natural emergencies (e.g. bad weather) and so the traffic can be very volatile. To make matters worse, traffic is usually magnified by calling customer or system repeat attempt behaviour. Any system needs effective overload controls in order to avoid excessive response times and reduced throughput or even failure. In the case of an IN, there are architectural reasons why it may be especially susceptible to overload, which are explained below.

The essential components of the ITU-T IN functional model are shown in FIG. 2. The SCF (Service Control Function) 10 contains call control functions composed of the fundamental building blocks of services. These interact with service logic and data and interface to other functions including the SSF 12 and SRF 14. The SSF (Service Switching Function) 12 extends and modifies call control functions to allow recognition of IN service control 'triggers' in order to query the SCF 10 and manages signalling between the call control and SCF 10. The signalling message resulting from a triggered 'Detection Point' is an ID/P (Initial Detection Point), sent from the SSF 12 to the SCF 10. The SRF (Specialised Resource Function) 14 provides the resources required for the execution of IN provided services, e.g. digit receivers and announcements. The node which hosts the SCF 10 is usually referred to as an SCP (Service Control Point) and that which hosts the SSF 12, i.e. a switching system, as an SSP (Service Switching Point).

While the ITU standards specify an Intelligent Network in a distributed manner, independent of physical realisation, a typical IN architecture is centralised in the following sense: there are normally only a small number of SCF 10 instances and many instances (possibly hundreds) of SSFs 12 per SCF 10. Such high connectivity in combination with the usual capacity of each SSP means that the total demand that can be generated by the SSPs can easily be much greater than an SCP's capacity. Furthermore, the total SCP capacity is usually much greater than that of (say) a destination switching system to which it instructs connections to be made. Thus if an overload is focused in nature, i.e. the traffic is concentrated onto one or a few destination systems, then there are two possible consequences:

- a destination or the intermediate network, may not have an adequate overload control to limit the load processed, resulting in degraded performance (excessive response time or reduced throughput);
- even if controls are adequate, the bulk of the calls processed by the SCFs 10 may be ineffective because the destination resources (lines) are busy. The SCFs 10 would then be processing a large amount of ineffective workload, which may be causing other calls to be rejected that would otherwise have had a good chance of completing. The effective throughput of the SCFs 10 would, therefore, decrease.

BRIEF SUMMARY

An automatic, focused-overload control scheme designed by the present inventor is thew subject of a patent application filed in the name of BT [4]. Commonly known as Automatic Call Restriction or Dynamic Call Restriction, the scheme is for the resource to have a way of rejecting demand locally (internal restriction) when its utilisation becomes high, together with a way of rejecting demand at a source of traffic in order to limit the reject rate (external restriction). The internal restriction can be designed to limit the response time of the system, whilst the external restriction limits the rejected or ineffective demand and hence maintains a high effective utilisation of the resource. In that invention, a goal reject (failure) rate is specified and the actual rejects are monitored using a leaky bucket. A monitor bucket is only allocated once an indication of rejected call has been received. The rising and falling of the bucket count across thresholds dictates whether the level of restriction (i.e. the rate admitted by the control) is increased or decreased respectively. Effectively, the rate admitted is adapted according to whether the observed reject rate is above or below the goal rate.

Two approaches to the problems of overload, discussed above are set out below. The first does not use feedback and may be termed "open-loop". The second uses feedback and may be termed "closed-loop". As described here, the open loop scheme may be applied independently or in concert with the closed loop scheme. Each addresses a different overload scenario. The two overload scenarios may occur separately or may coincide. Coincidence not only makes convergence to a desired level take longer but also may introduce instability that can take a very long time to dissipate. Consider a service provider with a large answering capacity (number of lines) initially carrying very little or no traffic, that is subject to a sudden increase in calling rate. Because the occupancy is initially low, the entire first batch of calls is accepted leading to a rapid increase in the line occupancy. Because no calls are rejected, restrictive control at source is not activated and the arrival rate at the destination is not constrained. However, rejections start as soon as the line group becomes full. In fact, because the arrival rate is so high and because none of the lines will clear until the holding time is reached, there is a period during which all newly arriving calls are rejected. Thus, the reject rate goes from zero to an extremely high level virtually instantaneously.

This very high level of rejections will lead to control at the source(s) being activated. The arrival rate will also be very high and could be the cause other problems in the system/ network. As the very high reject rate persists for about a holding time, the control at the source(s) may reduce considerably during this time interval. After a further period, the lines start to clear. If the holding time is fairly consistent, all lines may clear at virtually the same time. Even if the arrival rate is now very low and the lines are only filling slowly, because the reject rate is now back to zero the control starts to quickly adapt the admitted rate upwards. By the time the lines are full again, the arrival rate may again be very high and the whole cycle will repeat.

Clearly, the severity of this effect depends upon the number of lines and the holding time and in particular, is worse if the holding time distribution has a low variance (typical of many mass-answering scenarios). One could, possibly, design the control parameters to give better performance for a particular set of conditions but then the control would not be a generic control that could respond effectively to any conditions that were unknown in advance. Such generic control is clearly a great advantage in terms of minimising network administration, resources and robustness.

DETAILED DESCRIPTION OF EXEMPLARY EMBODIMENTS

Figure 1:
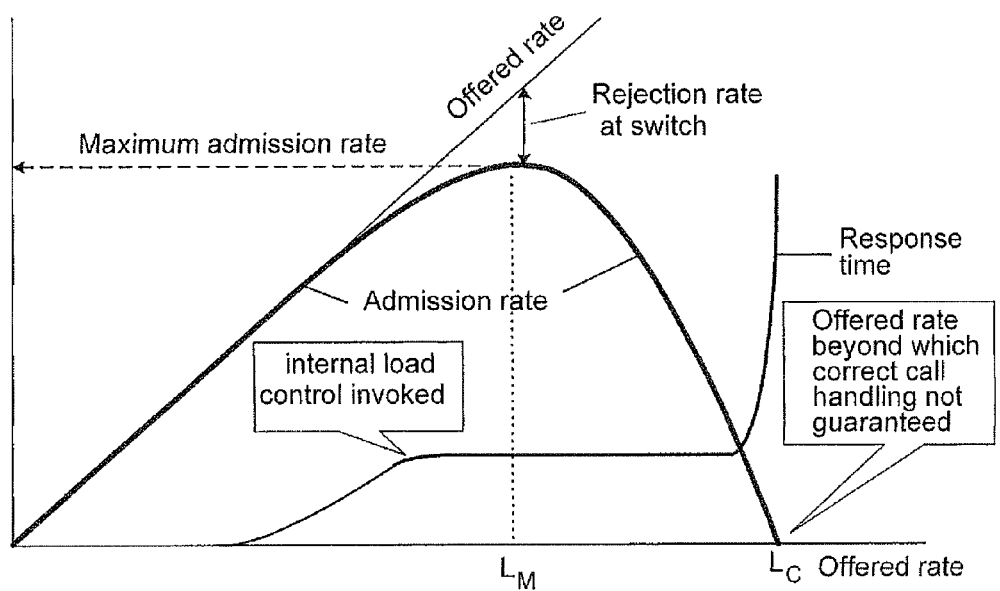
FIG. 1 shows a graph of typical throughput for a conventional network system.

Open Loop.

A common characteristic of overloads is a very sudden increase in load—which can, in the extreme case, equate to a step increase in the calling rate. This can cause a problem for a system in which control is only activated once indications of rejected requests have been generated by the overloaded resource and received at the point of control; due to the delay in providing feedback. It could happen that message/signal queues in downstream resource(s) overflow before the control has received feedback and applied a restriction to the admitted rate. This is compounded when there is a large number of sources of traffic and points of control, as feedback needs to be provided to each before they can all apply restriction. This is not only an overhead on the overloaded resource and the intervening network but also introduces delay General Principles The scheme described here works by monitoring the rate at which requests arrive at a point of control (restriction) and adapting the maximum admitted rate, which we will refer to as the control rate. This rate could be enforced by any method of restriction, such as a leaky bucket that has appropriate characteristics. The key parameter of a leaky bucket control system is the leak rate and it is control of this parameter that determines the behaviour of the control system. The value at which the leak rate is set is the control value.

When the measured arrival rate is varying slowly the control rate is set to be sufficiently greater than the arrival rate so that the probability of a request being rejected is small. Configurable parameters determine how much greater the control rate is and the value of this probability. When the arrival rate starts to increase more quickly the control rate is allowed to increase but the rate of increase is constrained. In general the rate of increase allowed is a function of the current control rate and the measured admitted rate but for the particular realisation described below this is a linear function.

Outline Description

Updates to control values occur in discrete steps based upon measurements over the time intervals between these steps and previous control values. Over the time interval, of length $\delta t$, from step i to step i+1, let the mean admitted rate measured be $\gamma_i$ (i.e. after control has rejected any requests) and the control value be $\mu_i$. Then the control value for the next interval is set to;

$$\mu_{i+1} = \min\{f(\gamma_i), g(\mu_i, \delta t)\}$$

where f and g are increasing functions that satisfy the following:

with a fixed mean arrival rate, f should result in a probability of rejecting a call to be sufficiently small, i.e. smaller than some constraint on service losses;

the function g is an increasing function of both arguments, so that the admitted rate is allowed to increase as time evolves.

The mathematical term increasing function is defined as follows. A function of one or more variables is said to be increasing in a particular one of those variables if, as the variable is increased whilst the others remain constant, the value that the function takes increases or remains the same. This implies that if the same variable is decreased then the value of the function decreases or remains the same. A function of more than one variable is increasing if it is increasing in every variable. A function of several variables is strictly increasing in a particular one of those variables if, as the variable is increased whilst the others remain constant, the value that the function takes increases but does not remain the same. This implies that if the same variable is decreased then the value of the function decreases but does not remain the same.

The time interval $\delta t$ between steps can be made to vary: increasing when the arrival rate is not varying much but decreasing when it is increasing quickly. This allows the maximum admitted rate to be increased as rapidly as the function g will allow. This can be achieved by making an update to the control rate from $\mu_i$ to $\mu_{i+1}$ either when the count of arrival of service requests to the control reaches a specified threshold or when the time between updates reaches a specified maximum time $\delta t_{max}$, whichever occurs first. Fast arrival rates will cause control updates due to the former condition and slow arrival rates due to the latter, with correspondingly smaller and larger values of $\delta t$ respectively. As an example, it has been found to give good behaviour if both of these functions are linear, so we set:

$$\mu_{i+1} = \min\{a\gamma_i, \mu_i + c\delta t\}$$

where we will call the coefficients a and c the Control Rate Coefficient and Increase Coefficient respectively.

We can derive the threshold time that determines which value for the next control rate $\mu_{i+1}$ to apply. Using the above expression, the conditions are therefore:

$\mu_{i+1} = a\gamma_i$ when $a\gamma_i \leq \mu_i + c\delta t$, or equivalently $\delta t \geq (a\gamma_i - \mu_i)/c$ $\mu_{i+1} = \mu_i + c\delta t$ when $a\gamma_i \geq \mu_i + c\delta t$ or equivalently $\delta t \leq (a\gamma_i - \mu_i)/c$ Notice that if the admitted rate is near constant, so that for two successive steps i and i+1 we have $|\gamma_{i+1} - \gamma_i| < \epsilon$ for some 'small' value $\epsilon$ and we have applied $\mu_{i+1} = a\gamma_i$ at step i, then for the next step i+1 we have $$(a\gamma_{i+1} - \mu_{i+1})/c < (a(\gamma_i + \epsilon) - a\gamma_i)/c = a\epsilon/c$$

which is also 'small', so that it is likely that $\delta t$ is larger than this, in which we re-apply: $\mu_{i+2} = a\gamma_{i+1} \approx a\gamma_i$. This demonstrates that for slowly varying traffic the control rate remains unchanged.

In practice we would also want to set extreme upper and lower bounds upon the control value, say $\mu max$ and $\mu min$ respectively and so we would also apply the following adjustment after the above update:

$$\mu_{i+1} = \min\{\max\{\mu_{i+1}, \mu_{min}\}, \mu_{max}\}$$

Example Realisation

An example realisation will now be described with reference to informal SDL (Specification Design Language) notation in FIG. 6 (a summary of the SDL notation is given in an appendix hereto). This defines a single process called the Open Loop Rate Adaptor process, with a single state OPEN 600, that interfaces with external processes by the transfer of signals. In particular, it must interface with the controller that is doing the rate restriction (rejecting requests), which we will refer to here as the 'restrictor'. Here we use the term Control-Rate for the maximum control value, and it is this that is adapted and used by the restrictor.

Three signals may be received by the Open Loop Rate Adaptor:

RestartRateAdaptor 601: This is used to start or restart the process and initialise all variables 606, passing an initial value for the ControlRate to provide a current state at 608.

AdmitCommit 602: This indicates that the restrictor has admitted a request.

ControlReject 603: This indicates that the restrictor has rejected a request.

One signal is sent:

UpdateControl (604-621): This is an instruction to the restrictor to change the ControlRate, which is passed with the signal.

The time interval between updates (i.e. instructions to the restrictor to change the ControlRate) is allowed to vary (604, 605), with a maximum length UpdateIntervalMax (tested at 607). In order that ControlRate can increase as quickly as the IncreaseCoeff will allow, the arrivals (before being subject to control) are monitored and counted as ArrivalCount. The time since the last update UpdateInterval is also calculated. So, an update is made at 610 either when UpdateInterval exceeds UpdateIntervalMax or ArrivalCount exceeds ArrivalCount-Max. Otherwise, an exit is made to the current state at 609.

The admitted calls are also counted as AdmitCount. Each update time the admitted rate for the last interval is computed at 610 as:

AdmitRate:=AdmitCount/Updateinterval.

It is then possible to smooth the rate to obtain a moving average rate MeanAdmitRate. In this example realization, we have used geometric smoothing with a coefficient pO (where $0<pO\leq 1$) that is only applied for decreases to the rate, but without smoothing (at 611, 612, 613, 614) for increases in order that the ControlRate can be increased rapidly:

MeanAdmitRate:=pO×AdmitRate+(1−pO)×MeanAdmitRate

However, smoothing is optional for increases or decreases and with different coefficients possible in either case (no smoothing is the same as setting the coefficient to 1).

Having determined the MeanAdmitRate, the ControlRate for the next time interval can now be determined at 615, 616, 617, 618, 619, 620. The following is applied, as described above:

ControlRate:=min{ControlRateCoeff×MeanAditRate, ControlRate+IncreaseCoeff×Updateinterval}.

Finally, the ControlRate is bounded at 618 between ControlRateMin and ControlRateMax. Once an update has been made, it is necessary to reset the variables at 620 before exiting at 621:

ArrivalCount:=0
AdmitCount:=0
UpdateInterval:=NOW

Figure 6:
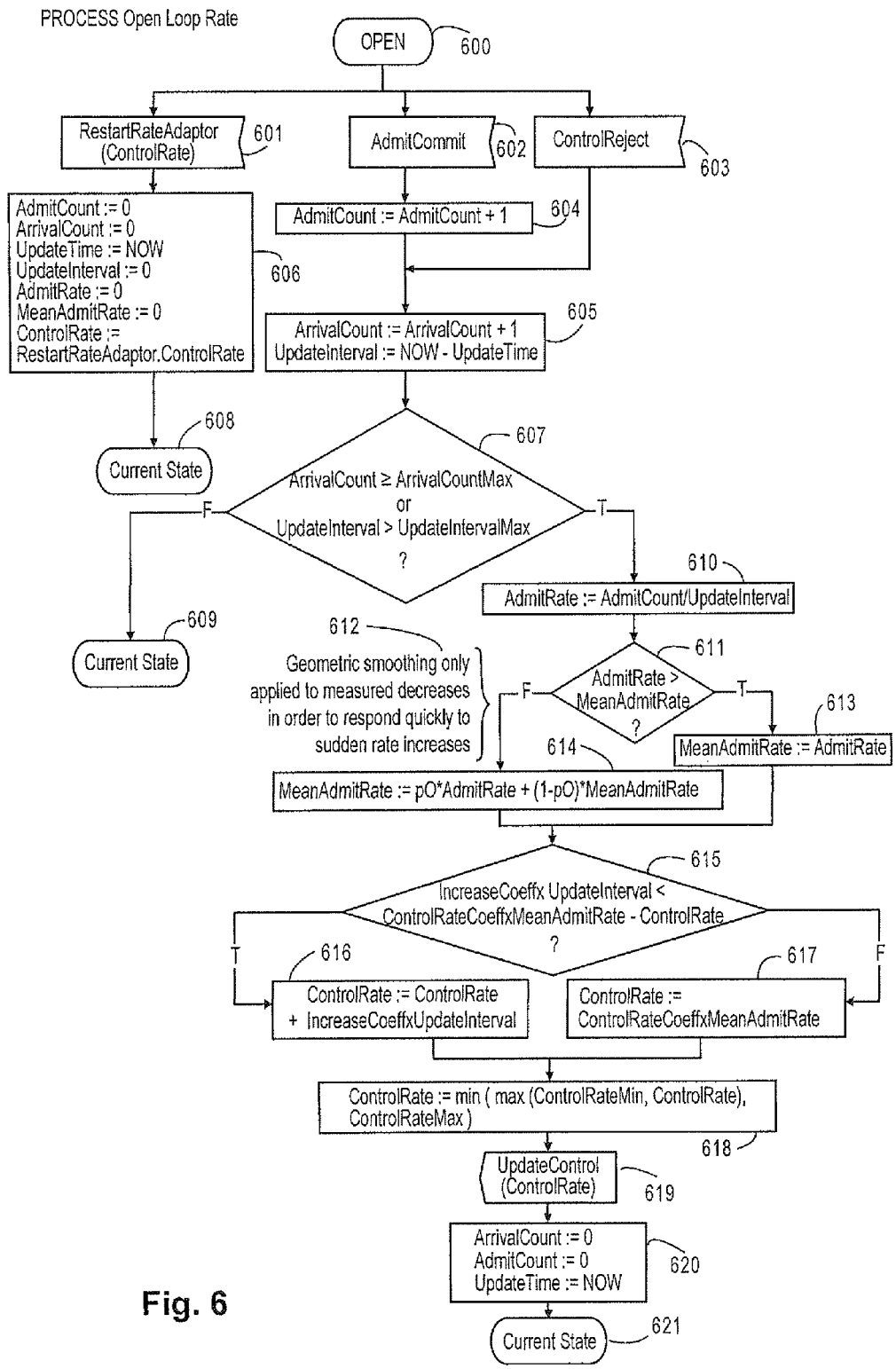
FIGS. 6, 7(a), 7(b), 7(c), 8(a), 8(b) and 8(c) show in schematic form procedures according to different aspects of the present invention.

The control parameters and the dynamic variables used in the control are summarised in Table 1 and Table 2 (see annex) respectively and the logic specified by the SDL in FIG. 6.

Closed Loop.

Another factor that limits the effectiveness of a control scheme where the rejection rate alone is used to adapt the rate admitted by the control, is that the capacity of the overloaded destination resource can vary enormously and unpredictably. For example, voice calls may be directed to a single terminating line or to an answering centre with several thousand lines. Furthermore, the holding time of calls can vary considerably. Whilst such a scheme does not need to know the capacity of the destination in order to converge to the optimal admitted rate (R3), the speed of convergence will not in general be as fast as a scheme where the destination capacity is known. The "closed loop" control scheme, described below, is designed to overcome this limitation and provide much more rapid convergence without having to know the capacity of the overloaded resource in advance.

A measure of the effectiveness of closed-loop control scheme is how quickly they converge to the goal rate, as discussed above. The invention described uses a novel way of adaptation, so that the convergence to the goal rate is both rapid and simple to implement (low overhead).

General Principles

As the rate of requests offered to a network resource increases its utilisation normally increases. For example, the measure of utilisation might be the average number of lines occupied in a group of voice carrying lines (circuits) or the occupancy of a CPU (processor) and/or the length of a queue of messages. As the utilisation increases the resource (or an associated resource) often has the ability to explicitly reject requests by returning a signal of rejection to sending nodes, e.g. the originators of the calls and, possibly, to intermediate nodes as well.

Explicit rejection of a request attempt may consume some of the capacity of the resource. This will be the case if the resource is a processor. On the other hand, resource capacity may not be required to signal rejection, such as when the resource is a group of lines (circuits) that can each be seized for a voice call.

Figure 3:
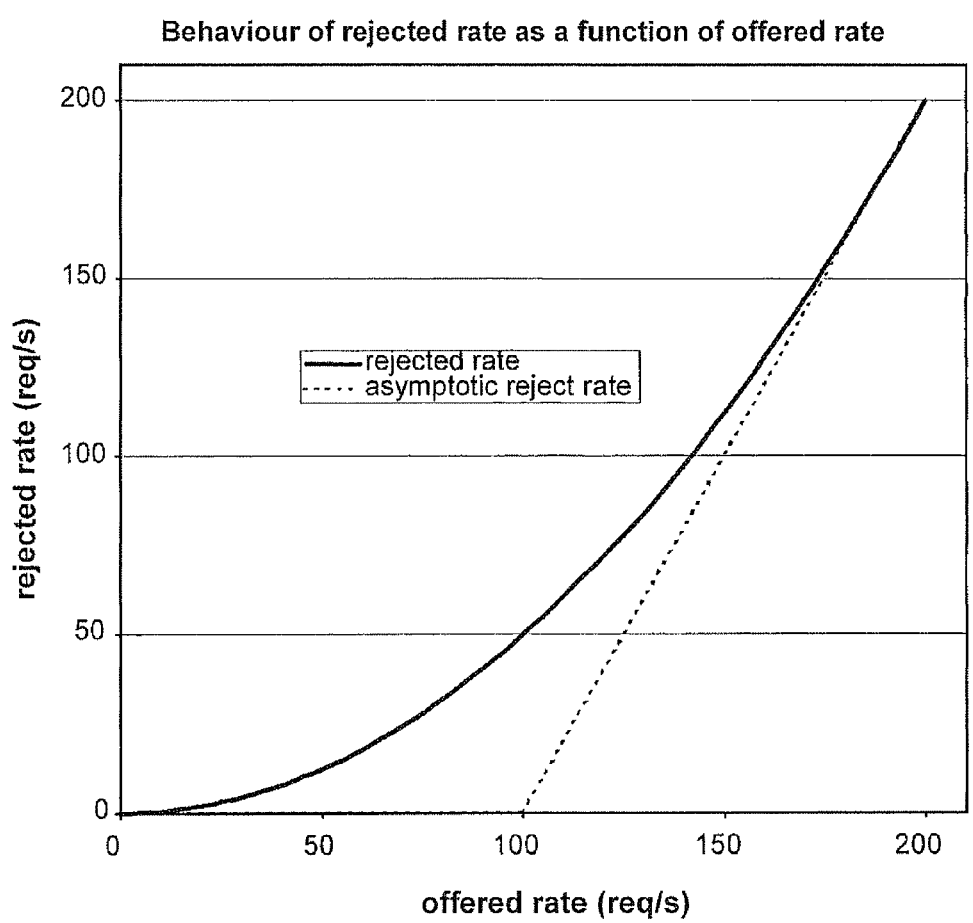
FIGS. 3 and 4 show graphs of rejection characteristics for a conventional network system.

In any case, the rate of rejected requests typically has the asymptotic behaviour shown in FIG. 3. FIG. 3 shows the relationship between the number of offered and rejected calls at a node. It can be shown that the slope (gradient) of the straight-line asymptote is $$s = \frac{1}{1-r}$$

where r is the ratio of the effort to reject to that to accept a request. Notice the following about this curve, which are important factors that determine the convergence of the scheme to be described:

The gradient of the rejected rate is always less than s and is an increasing function of the offered rate;

As long as r is strictly positive (s>1) there is an upper limit to the offered rate. Beyond this the system goes into 'collapse' where it cannot reject any more traffic;

If the ratio r=1 then s is infinite. In fact the scheme to be described would not work but this would be a very badly designed system where the cost of rejecting demand was the same as accepting it;

If the ratio r=0 (s=1) then in fact there is no upper limit to the offered rate as shown and the curve never reaches the asymptote.

This asymptotic behaviour is a characteristic of any resource "downstream" of the controller. Any one or more such resource may become the bottleneck (more than one at a time is possible although less likely).

Figure 2:
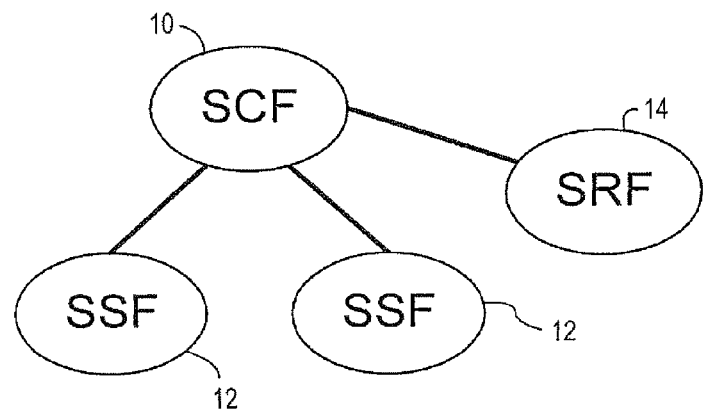
FIG. 2 in schematic form elements of a conventional Intelligent Network.
Figure 4:
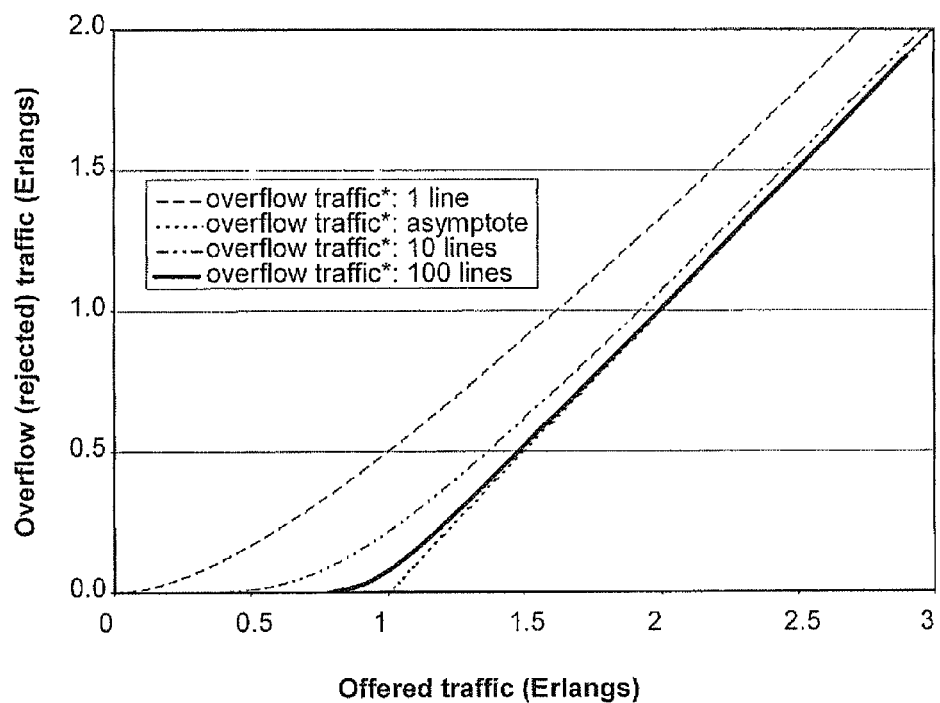

The last case, where no resource capacity is required to reject a request (often referred to as an 'overflow'), is exemplified by a group of lines being offered voice calls, where each call holds a line for a period with mean value the holding time. The overflow rate has the same asymptotic behaviour as the overflowed traffic (in Erlangs) and is illustrated in FIG. 2, where the offered and overflow traffic have been normalised by dividing by the number of lines (therefore they never exceed 1). This allows one to easily see how the shape of the curve changes as the number of lines changes but it will be noticed that the properties listed above are satisfied in every case, FIG. 4 shows the actual rejected rate as a function of offered rate for 10 lines and holding time of 10 seconds. The aim of the control is to converge to the target (or goal) reject rate, which in this example is set at 0.5 calls/sec. This occurs where the curve of constant rate equal to the target reject rate intersects the rejected rate curve.

Updates to control are taken at discrete steps based upon measurements over time intervals between these steps and previous control values. Suppose that the mean offered rate, i.e. the rate at which calls are sent to the overloaded resource, between steps i and i+1 is measured to be γi and the overflow (reject) rate for the same interval is ωi. Then the control rate at the i+1th update is set to be:

$$\mu_{i+1} = \max\{\gamma_i + \alpha(R-\omega_i), 0\}$$

I.e. this is what we would expect to measure for γi+1 so that ωi+1 would be an approximation to the control parameter R, which we term the Goal Rate. The other parameter α is the reciprocal of the gradient s of the asymptote and will be referred to as the Asymptotic Coefficient.

Figure 5:
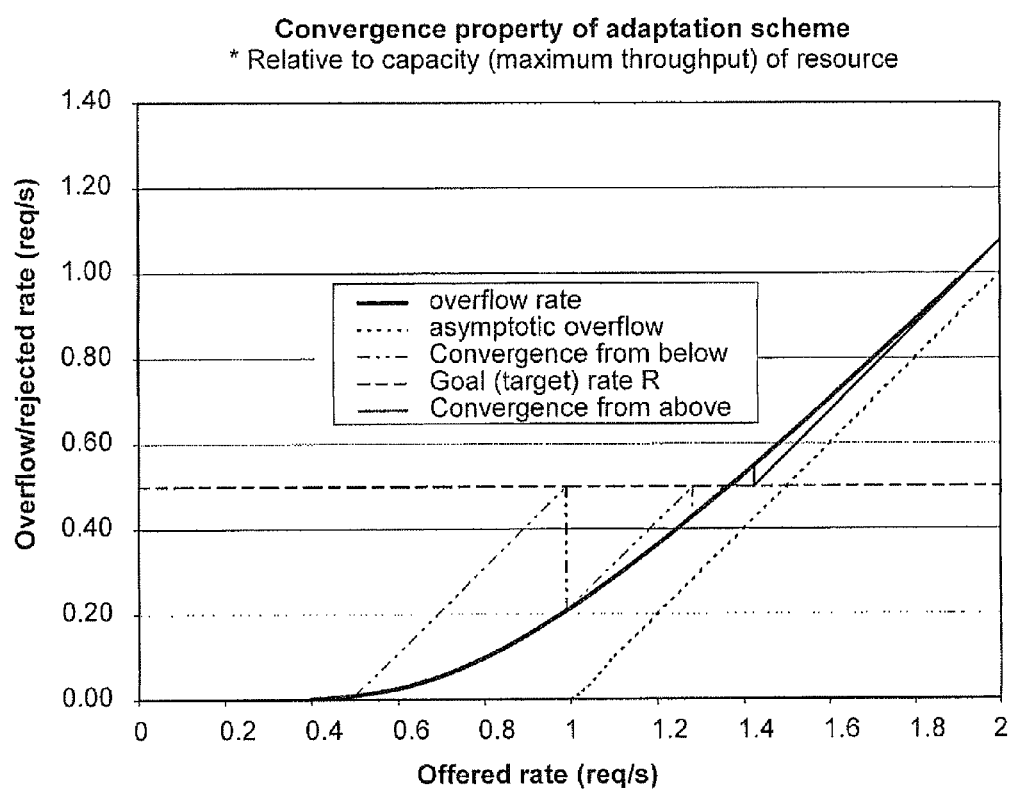
FIG. 5 shows a graph of how the rejection rate converges according to an aspect of the present invention.

FIG. 5 illustrates the special case when α=1 but other values give a similar picture. As illustrated in FIG. 5, update of the control rate may be obtained by subtending a line parallel with the asymptote from a point on the overflow rate curve corresponding to the current offered rate until intersecting the goal reject rate curve (which takes the form of a straight line parallel with the offered rate axis). The point of intersection with the goal rate curve coincides with the next control value (i.e. offered rate) to be applied to the overloaded resource.

It can be shown that, since the gradient of the overflow rate curve is always positive and less than 1, this method will always converge, whether from above or below the goal rate. Theoretically the updated rate should not be negative but because measured rates are subject to random variability, we need to account for this possibility. Hence the lower bound of 0 is applied in the above equation.

In fact we can enforce a lower bound that is greater than zero because we should not expect the measured reject rate received from the resource to be greater than the rate sent to the resource, since the number rejected must be less than or equal to the number sent. We $$\mu_{i+1} = \max\{\gamma_i + \alpha(R-\omega_i), R\}$$

In practice we would also want to set extreme upper and lower bounds upon the control value μ, say μmax and μmin respectively and so we would also apply the following adjustment after the above update:

$$\mu_{i+1} = \min\{\max\{\mu_{i+1}, \mu_{min}\}, \mu_{max}\}$$

It can be seen that the rate of convergence will depend upon how high the goal reject rate is and how high the starting point is. Convergence is clearly more rapid from above the goal reject rate because the gradient of the reject rate curve is closer to that of the asymptote when above the goal reject rate than below it.

The method explained above has to be realised by defining exactly how rates should be measured and when control should be started and stopped.

Figure 7A:
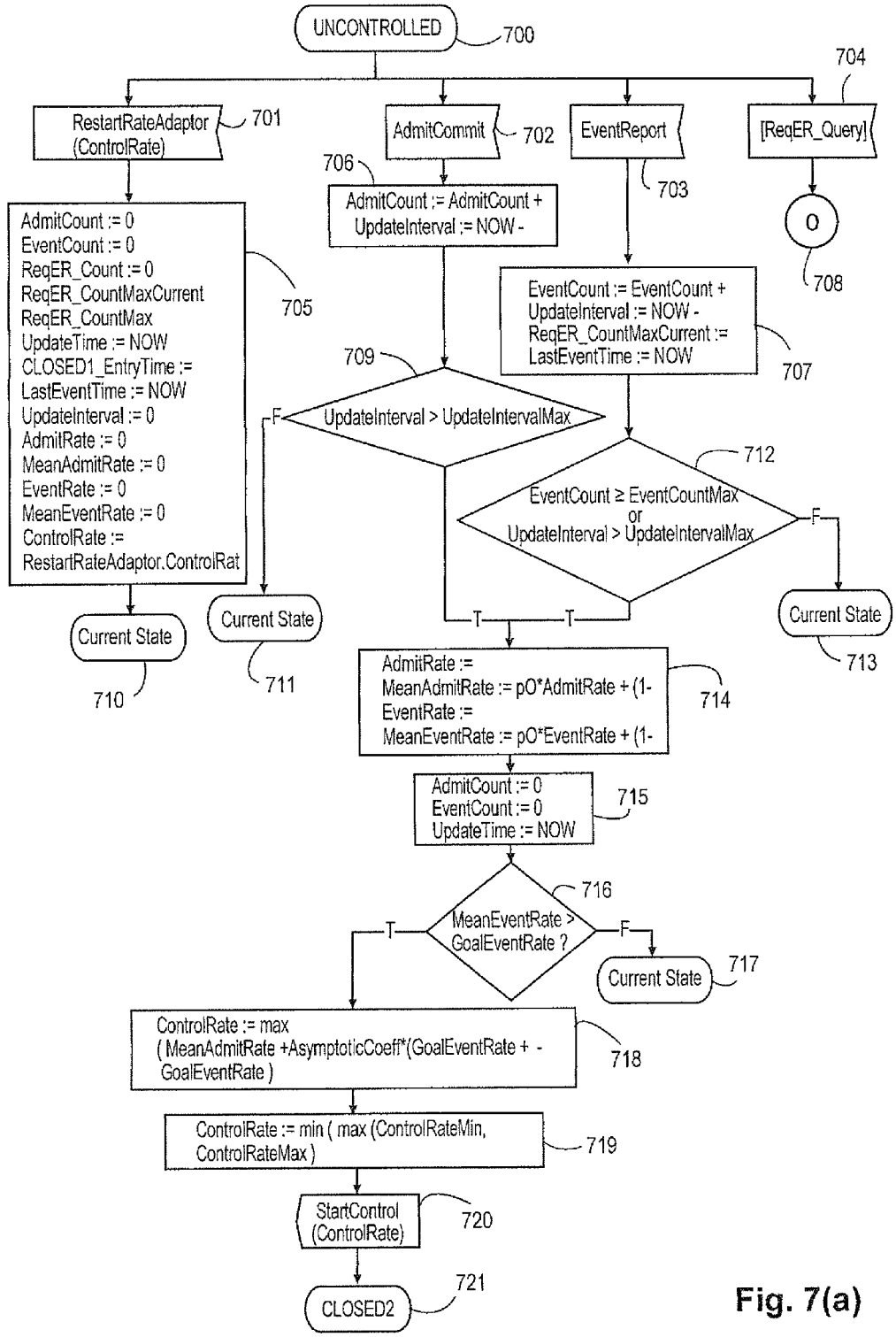
Figure 7B:
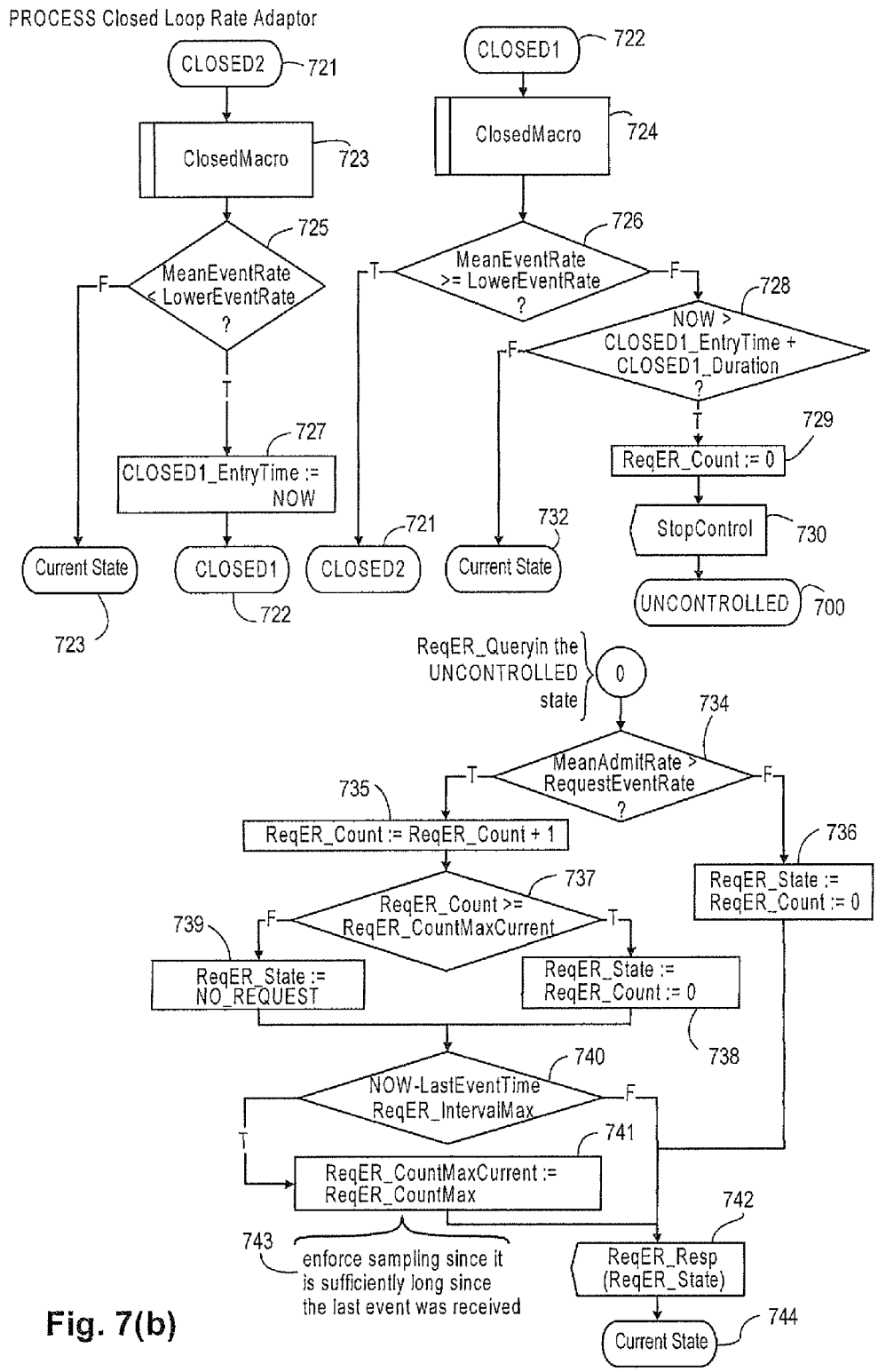
Figure 7C:
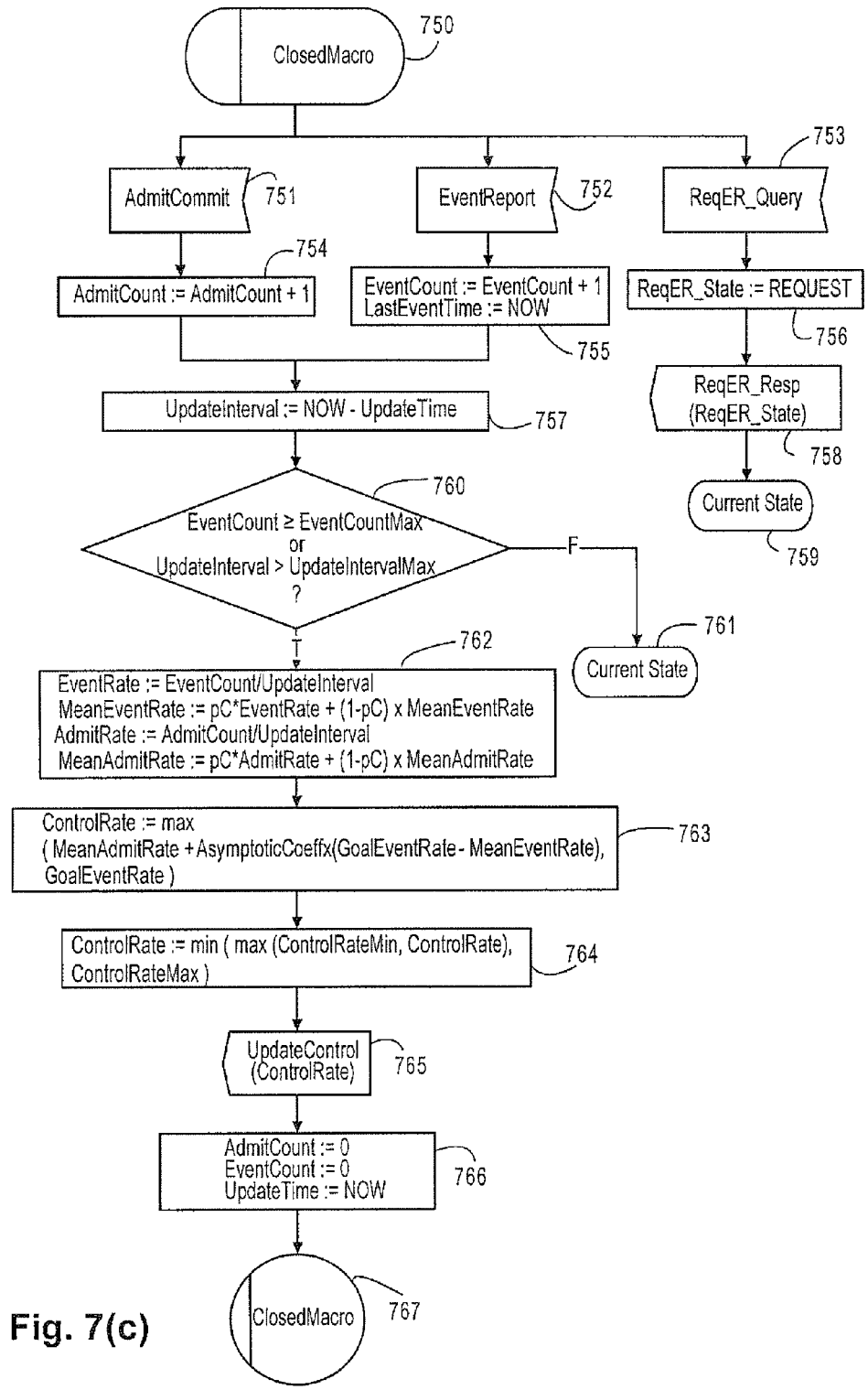

An example realisation is now described using informal SDL (Specification Design Language) in FIGS. 7(a), 7(b) and 7(c). A summary of the SDL notation is given in an appendix. The control parameters and variables used are summarised in Tables 3 and 4 (in appendix), respectively.

The SDL defines a process referred to here as the Closed Loop Rate Adaptor with three states UNCONTROLLED, CLOSED2, CLOSED1. It interfaces with external processes by the transfer of signals. In particular it must interface with the rate controller that is doing the rate restriction (rejection of requests), which we will term the 'restrictor' for short. Here we use the term ControlRate for the maximum control value and it is this that is adapted and used by the restrictor. Feedback in the form of call/connection request rejections or failures that drive the closed loop control will be referred to as "events". Note that these do not refer to rejections by the local restrictor itself but to 'downstream' feedback, i.e. from the resource.

The two closed states CLOSED2 and CLOSED1 which are used when restriction (control) is active are the same in terms of the updating performed. The reason why two states are used is to ensure that the system stays in a closed state for a sufficiently long period (dictated by a parameter CLOSED1_Duration) before moving back to the UNCONTROLLED state.

Three signals may be sent by the controller:

RestartRateAdaptor 701: this is used to start or restart the process and initialise all variables, passing an initial value for the ControlRate.

AdmitCommit 702: this indicates that the restrictor has admitted a request.

EventReport 703: this indicates the reception of an event.

Three signals are sent by the controller:

StartControl 720: this is an instruction to start restriction with a maximum rate given by ControlRate, which is passed with the signal.

UpdateControl 765: this is an instruction to the restrictor to change the ControlRate, which is passed with the signal.

StopControl 730: this is an instruction to stop applying restriction.

Admitted requests and events are counted in all states, as the variables AdmitCount and EventCount respectively, with corresponding moving average rates MeanAdmitCount and MeanEventCount, The time interval between updates to these rates, UpdateInterval, is allowed to vary, with a maximum length UpdateIntervalMax. This is also the (varying) time interval between updates to the ControlRate but these are only made in the two closed states or transition to them.

In the UNCONTROLLED state 700 an update to the mean rates is made at 714 either when at 712 UpdateInterval exceeds UpdateIntervalMax or EventCount exceeds EventCountMax. The idea of this is to respond quickly to sudden increases in the rate of events. Hence, an update is made periodically with UpdateIntervalMax whatever the event rate, but if the event rate increases an update will be forced sooner according to the EventCount.

At each update, the admitted and event rates for the last interval are computed at 714 as:

AdmitRate := AdmitCount/UpdateInterval

EventRate := EventCount/UpdateInterval and then the rates are smoothed to obtain a moving average rate MeanAdmitRate and MeanEventRate respectively. In this example we have used geometric smoothing with a coefficient pU in the UNCONTROLLED state:

MeanAdmitRate:=pU×AdmitRate+(1−pU)×MeanAdmitRate

MeanEventRate:=pU×EventRate+(1−pU)×MeanEvenRate

After these updates, if at 716 the MeanEventRate exceeds the GoalEventRate, then at 718 a ControlRate is computed according to the method described above:

ControlRate:=Max{MeanAdmitRate+AsymptoticCoeff×(GoalEventRate −MeanEventRate), GoalEventRate}

Then control is started at 719, 720 by sending a StartControl signal with the value of ControlRate and the CLOSED2 state is entered at 721. The common logic used in the both the closed states is defined in the ClosedMacro 750. The difference between these two states is in the possible transitions from them.

In the ClosedMacro 750, updating of rates is similar to that in the UNCONTROLLED state 700. The differences are that a different value pC of the geometric updating coefficient is allowed and the update to the ControlRate is always performed according to the formula above, resulting in the generation of an UpdateControl signal to be sent carrying this updated value. The next action depends upon which closed state the system is in.

In the CLOSED2 state 721, the derived value of MeanEventRate is compared at 715 to a parameter called the LowerEventRate. If MeanEventRate is greater (or equal), then no action is taken and the system remains in the CLOSED2 state at 733. On the other hand, if MeanEventRate is less, then transition to the CLOSED1 state 722 occurs and the time of this transition is recorded at 727 as CLOSED1_EntryTime.

If in the CLOSED1 state 722, then again the MeanEventRate is compared at 726 to a parameter called the LowerEventRate. This time if MeanEventRate is greater (or equal), the system goes back to the CLOSED2 state 721, but if MeanEventRate is less, then a test is performed at 728 to see if the system has been in the CLOSED1 state for a duration greater than the parameter CLOSED1_Duration. If so, the restriction is stopped 730 by sending a StopControl signal to the restrictor and the system enters the UNCONTROLLED state 700.

The use of two closed states ensures that the system stays in a closed state for 'sufficiently long' and does not flip back to the UNCONTROLLED state prematurely.

A further aspect of the invention includes an enhancement for limiting the monitored event rate. For many systems the explicit feedback constituted by the events is generated automatically, In some applications it has to be solicited and there will be some overhead in doing so. In order to improve efficiency in the latter case, there is the possibility of only requesting EventReports for a subset of the requests admitted. Two such methods, which can be used together, are described below. They both have the property that EventReports are always requested when in a closed state. This is usually important in ensuring that the stream of events is not thinned too much when adapting the ControlRate, an outcome that could give rise to statistical inaccuracy and therefore control instability.

These enhancements are indicated in the SDL diagram of FIG. 7 at 734-744. The application that is receiving and sending requests can ask the Closed Loop Rate Adaptor whether or not to make a request for an event report. This is indicated by the signal ReqER_Query at 734. The response is the signal RegER_Resp at 742 that carries a variable called RegER_Stat, which can take two values: REQUEST or NO_REQUEST, with obvious meanings.

The first method is simply to only request EventReports when the measured admitted rate (MeanAdmitRate) is greater than a control parameter threshold, the RequestEventRate. This can be seen in the SDL under connector 0, where if the MeanAdmitRate is below the threshold, then ReqER_State is set to NO_REQUEST.

Otherwise, a request may be made and this is where the second method applies. This method allows a sample of event report requests. An EventReport is requested every time a certain number of requests have been sent (admitted). This "certain number" is a variable called Req ER_CountMaxCurrent and the possible requested event reports are counted with the variable ReqER_Count. When control first starts in the UNCONTROLLED state, ReqER_CountMaxCurrent is set at 747 to the value of the control parameter ReqER_CountMax. For example, it might be the value 5, so that event reports are only requested for every 1 in 5 requests admitted. But as soon as an EventReport is received, ReqER_CountMaxCurrent is set to 1, so that an event report is requested for every admission. A time interval ReqER_IntervalMax is used to go back to sampled requesting. Whenever a ReqER_Query is received in the UNCONTROLLED state, first the rate threshold test is made—as in the first method, described above. If an event request is possible, then ReqER_Count is increased by 1 at 735 and then compared at 737 with ReqER_CountMaxCurrent. If the count has reached this limit, then a request is made by setting ReqER_State to have the value REQUEST and sending the signal ReqER_Resp and the count is reset to zero at 738. In addition, a check is made at 740 to see if the time since receipt of the last event report is greater than ReqER_IntervalMax. If so, the value of ReqER_CountMaxCurrent is reset at 741 to the larger value ReqER_CountMax to start sampling again.

The flowchart of FIGS. 7(a)-7(c) is otherwise self-explanatory as to the operations and states represented by boxes 700-767.

Combined Open- and Closed-Loop Control

The novel methods of open and closed loop control described above can advantageously be integrated into a single control scheme, thereby obtaining increased benefits.

The principles are the same but integrating the two involves some changes. The open loop scheme has just one type of behaviour (state) where restrictive control is always active whereas the closed loop scheme, restrictive control may be either inactive or active (closed type of behaviour). The integrated control scheme has a control that has essentially two behaviours: open loop behaviour and closed loop behaviour but, unlike the closed loop arrangement, it is always active so the restrictor is always able to reject requests.

Example Realisation

Figure 8A:
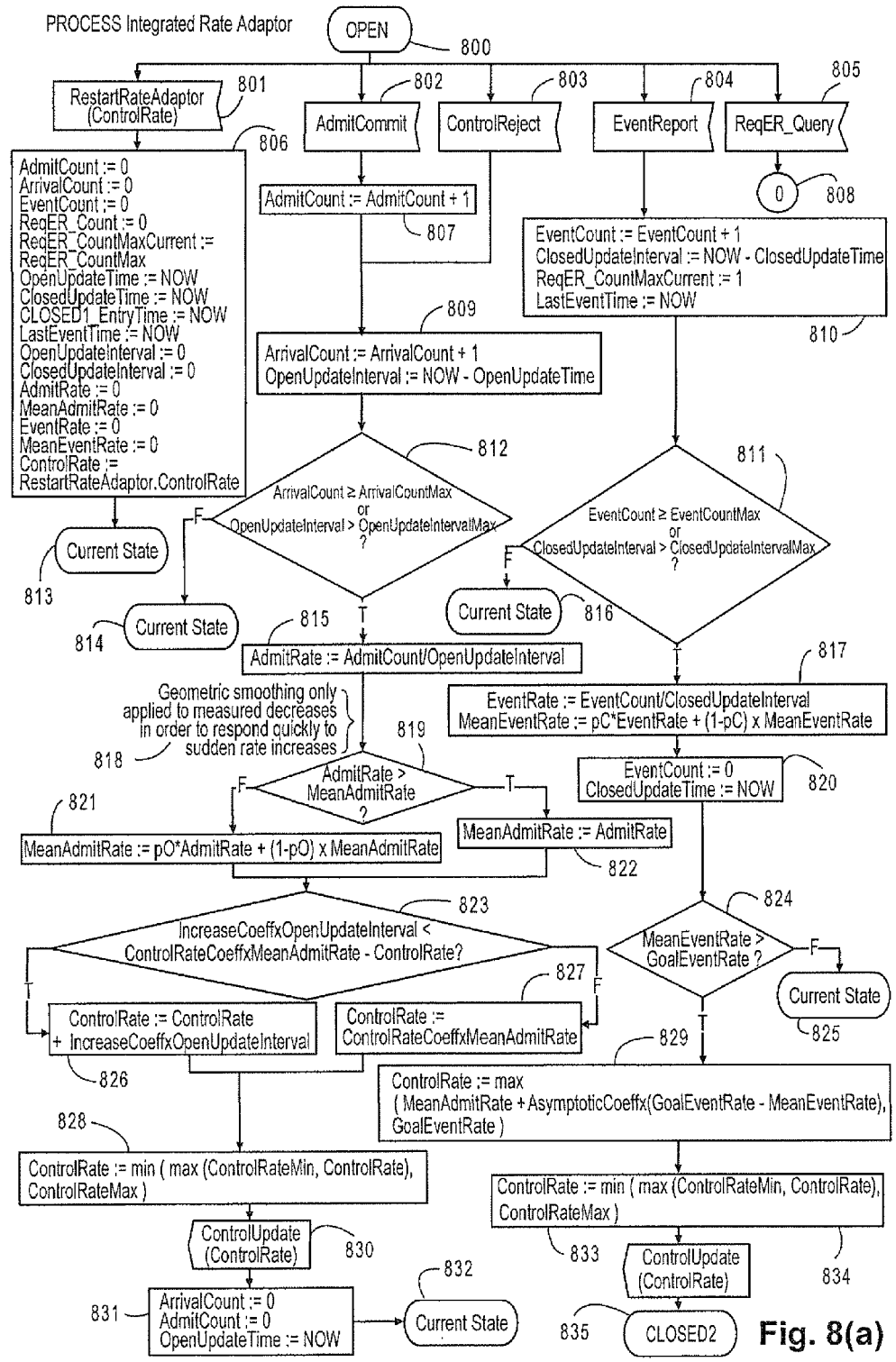
Figure 8B:
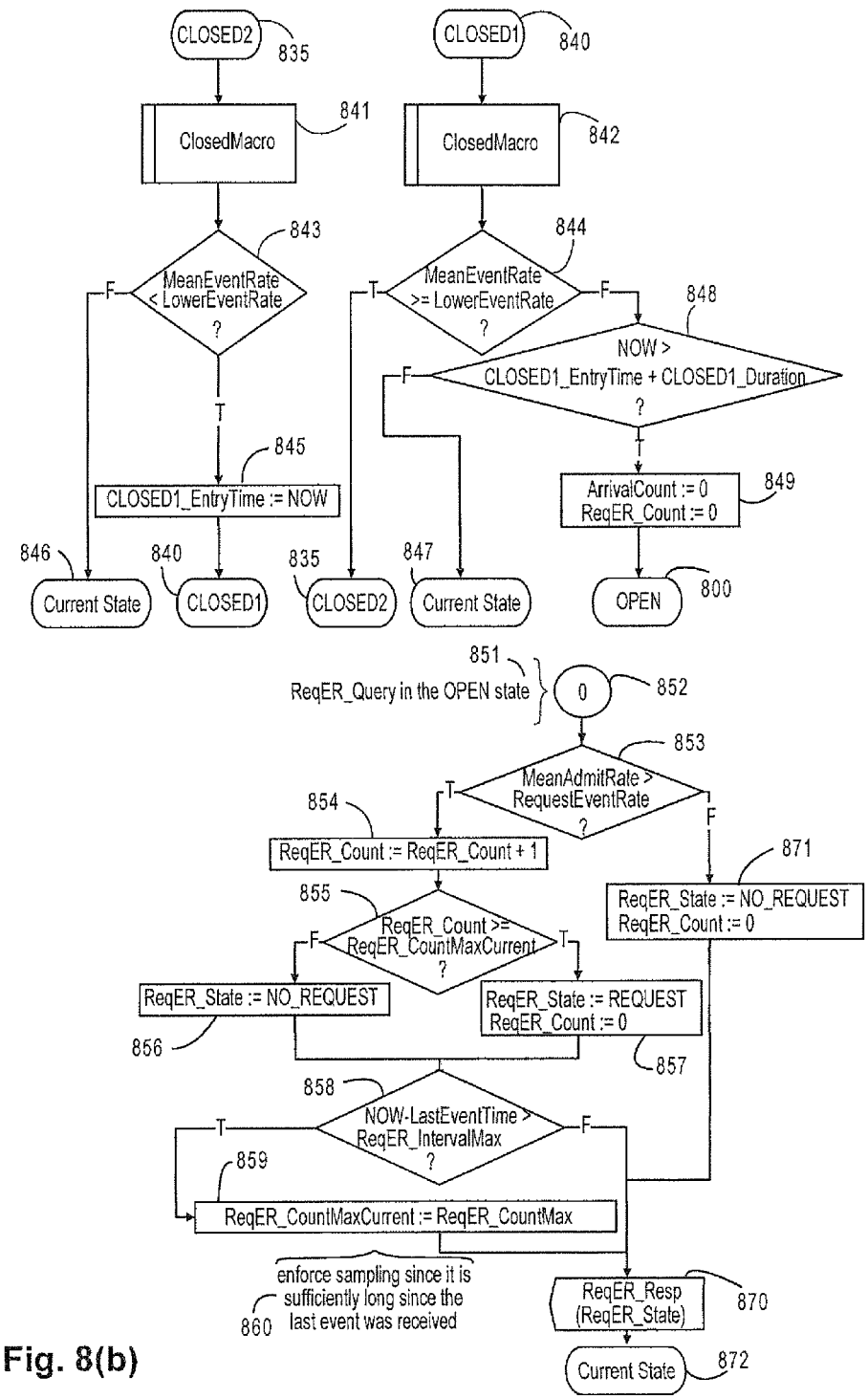
Figure 8C:
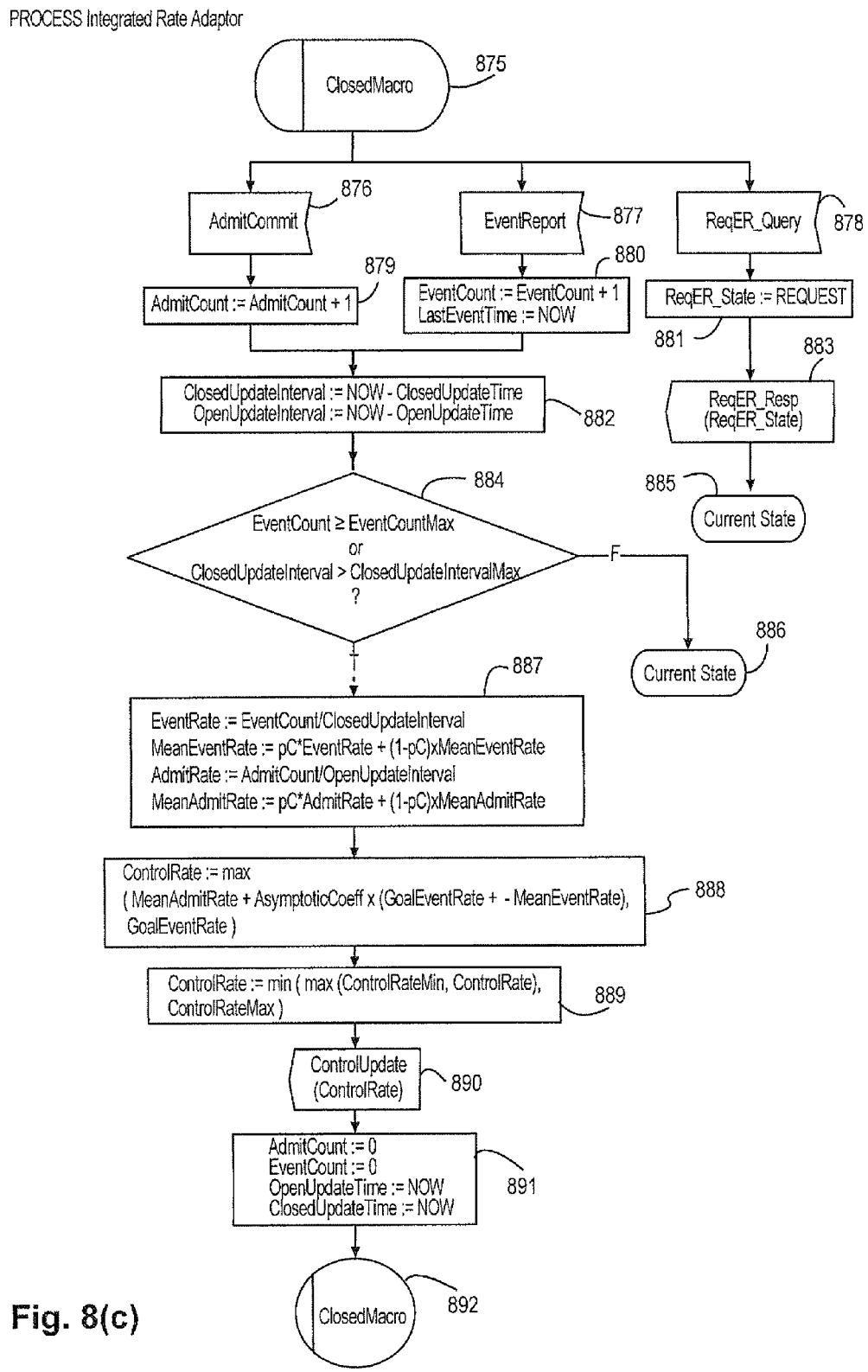

An example realisation is described using SDL in FIG. 8(a), 8(b) and 8(c). The control parameters and variables used are summarised in Table 5 and Table 7, respectively.

The process according to this further aspect of the invention will be referred to as the Rate Adaptor. Rate Adaptor has three states: OPEN (800), CLOSED2 (835) and CLOSED1 (846), analogous to the single state of the open loop scheme and the two closed states of the closed loop scheme, respectively.

The set of signals that may be received is the union of those received by the open loop scheme and the closed loop scheme. The signals sent are only those of the open loop scheme. This is because control is never started or stopped and therefore StartControl and StopControl are not required.

The OPEN state is like an amalgam of the OPEN state from the open-loop scheme, described above, and the UNCONTROLLED state from the close-loop scheme, also described above. However, according to the integrated control scheme, the update time interval is allowed to be different in each state, so that we have an OpenUpdateIntervalMax and a ClosedUpdateIntervalMax.

The flowchart of FIGS. 8(a)-8(c) is otherwise self-explanatory as to the operation and states represented by boxes 800-892.

Specific Example Applications

In the examples presented below, with reference to FIGS. 9 to 12, the general arrangement consists of many source nodes 90 of traffic (which may be themselves relaying traffic from elsewhere, not necessarily the original source of traffic) passing or attempting to pass messages (requests) to an overloaded resource/node 92. Each type of control (Open or Closed loop) has three main functions:
  Monitoring the rate admitted by control γ (denoted by M);
  Updating the control rate µ (denoted by U);
  Restricting the traffic by applying a rate control algorithm (denoted by R).

These control functions may be replicated across the node and may reside at the source node or at overloaded nodes.

The monitored admitted rate may be a part of the total rate admitted to the overloaded resource, e.g. if monitored at one or more the sources node or the total admitted rate, e.g. if monitored at the overloaded node. Similarly the control rate derived by updating may be divided in some way amongst many points of restriction.

Examples of actual network protocol applications are shown in the following table:

TABLE

Example applications of the controls, including source node and overloaded node functions and protocols

| source node | overloaded node | initial message |
|---|---|---|
| telephony switch (e.g. ISUP) | telephony switch (e.g. ISUP) | IAM or IFAM |
| telephony switch (e.g. ISUP) | terminating voice line group | IAM or IFAM |
| SIP server | SIP server | Invite |
| IN SSP | IN SCP | IDP |
| HTTP (Web) proxy server | HTTP (Web) server | Request |

Open Loop Rate Control

Figure 9:
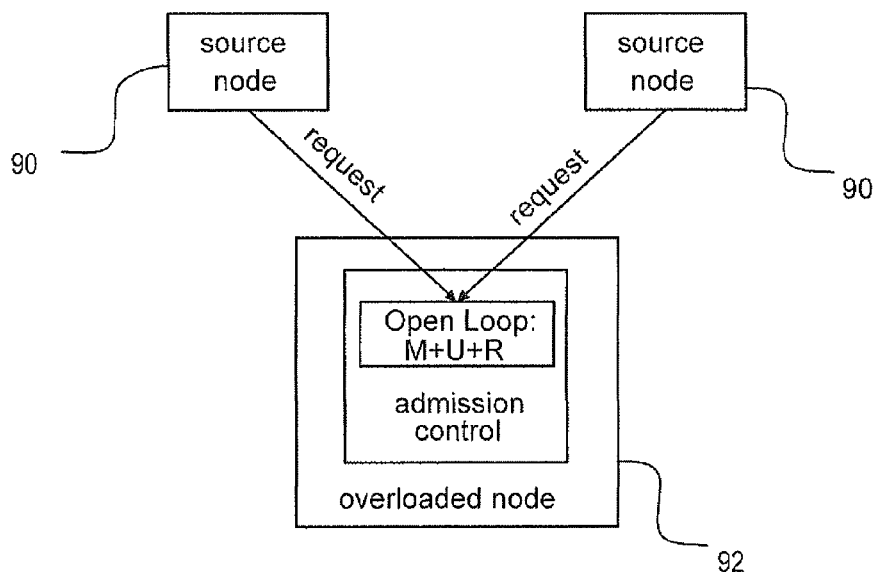
FIGS. 9 to 12 show in schematic form network nodes according to different aspects of the present invention.
Figure 10:
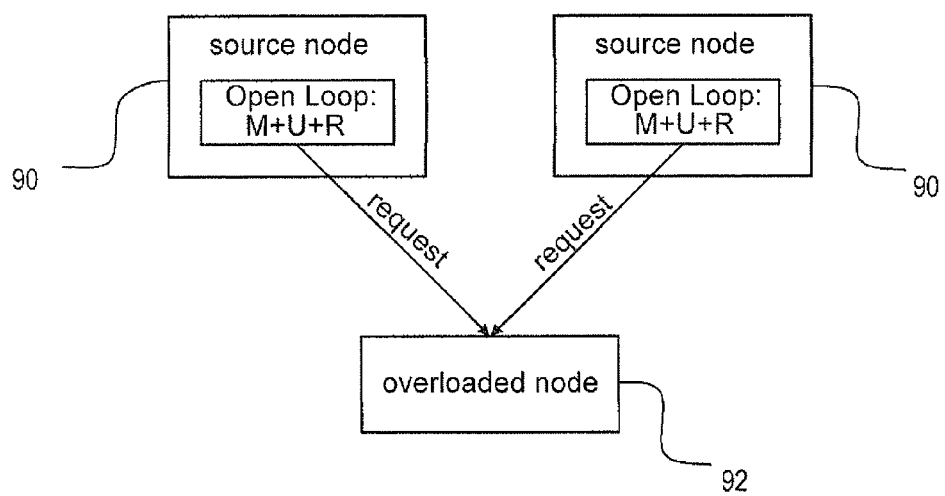

All open-loop functions may be co-located. This is shown in FIGS. 9 and 10 where FIG. 9 shows open loop control with all functions located at the overload point and FIG. 10 shows open loop control with all functions located at the source(s). Alternatively, the functions may be located separately, e.g. an overloaded node can monitor the admitted rate and pass source control rates to source nodes.

Closed Loop Rate Control

Figure 11:
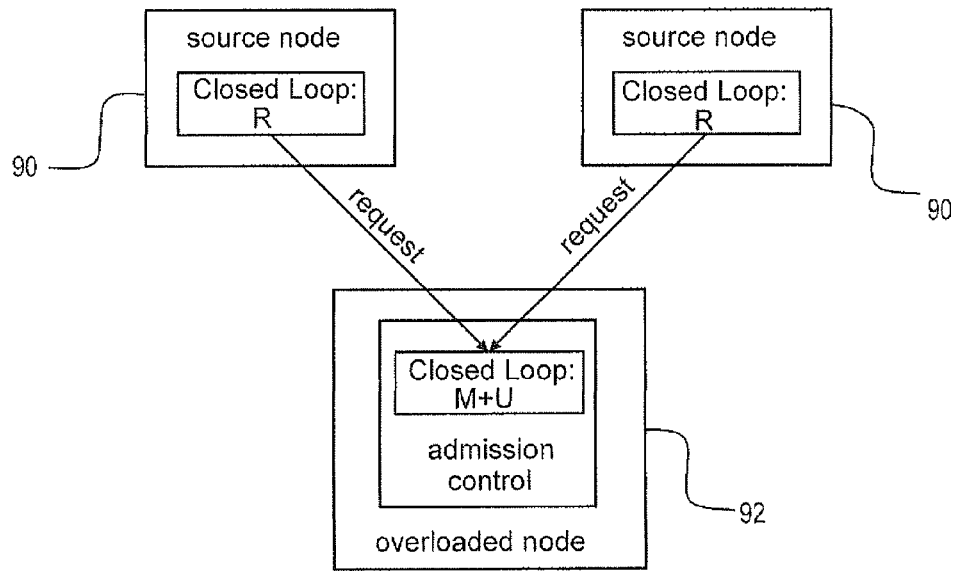

FIG. 11 shows an arrangement with the closed-loop functions split between the source(s) and the overloaded point.

Integrated Closed and Open Loop Rate Control

Figure 12:
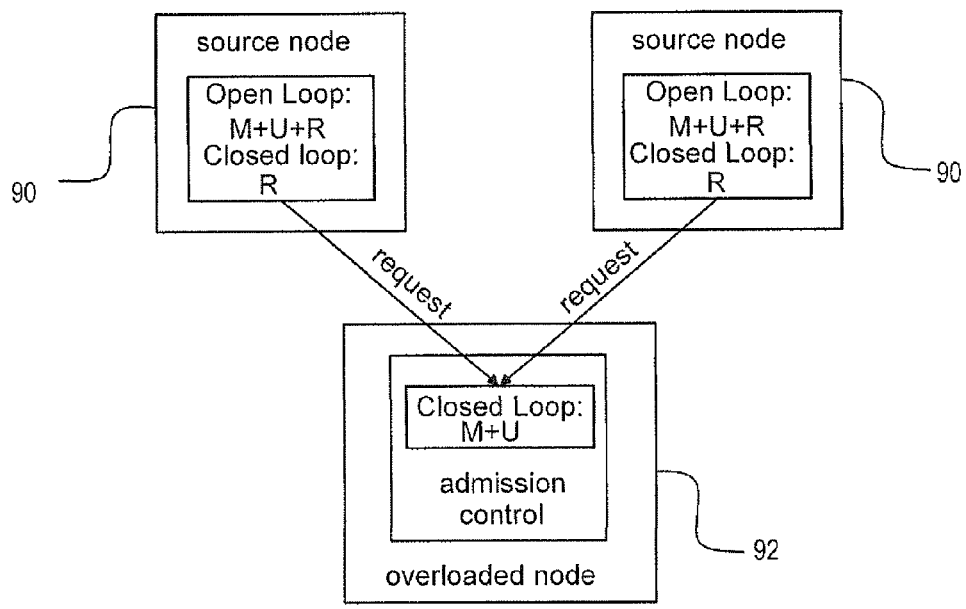

The component functions may be configured in a variety of ways. FIG. 12 shows, by way of example, all open loop functions located at the source with closed-loop functions split between the overloaded point and the source(s). Open and closed loop control schemes may be combined in series at different points in a network or at a single point. If applied at the same point in a network, the control value would be taken as the minimum of the values indicated by each scheme.

According to the present invention, faster convergence to the goal (target) reject rate R can be obtained by measuring the rate sent to the overloaded resource in addition to the reject rate itself and using the algorithm explained above to adapt the rate sent to the overloaded resource. In particular, the algorithm exploits the asymptotic behaviour of the rejection rate. The selection of a minimum rejection rate ensures that the target resource has a high level of utilisation so increasing the efficiency of the network.

The ideas discussed above originated in the field of controlling overloads in telephony networks. Consequently, much of the description is set in that context. However, the invention set out there applies across a wide range of services and technologies with minor variations within the scope of the invention and can be fruitfully applied to newer services and technologies. Although the present invention is described above predominantly with reference to Intelligent Networks, it has general application to resources prone to overload, including processors and other areas of communications technology such as ATM, ISUP, SIP, HTTP and Internet Protocol. In particular, the open-loop scheme has potential application to the control of any stream of messages.

Tables

TABLE 1

Control parameters used in the SDL definition of the open loop rate adaptor

| Parameter name (SDL) | Notation | Description |
|---|---|---|
| ArrivalCountMax | | Maximum count of arrivals (both admitted and rejected by control) before a mean admitted rate update is forced. |
| P0 | | Geometric updating coefficient in the most recent measurement. |
| UpdateIntervalMax | | Maximum time interval after the last update before a mean admitted rate update is forced. |
| ControlRateMin | | The minimum possible restrictor control rate. |
| ControlRateMax | | The maximum possible restrictor control rate. |

TABLE 1-continued

Control parameters used in the SDL definition of the open loop rate adaptor

| Parameter name (SDL) | Notation | Description |
|---|---|---|
| IncreaseCoeff | c | The coefficient multiplying the time interval since the last update and added to the ControlRate when the update frequency is high. |
| ControlRateCoeff | a | The coefficient multiplying the ControlRate when the update rate is low for slowly varying offered rates. |

TABLE 2

Variables used in the SDL definition of the open loop rate adaptor

| Variable | Notation | Meaning and use |
|---|---|---|
| AdmitCount | | Count of requests admitted by the Restrictor. This is reset to 0 each time an update to MeanAdmitRate is performed. |
| AdmitRate | | Average rate of admitted requests since the last update. |
| ArrivalCount | | Count of request arrivals (admitted and rejected) to the restrictor. This is reset to 0 each time an update to MeanAdmitRate is performed. |
| ControlRate | $\mu$ | The maximum admitted rate to be applied by the restrictor as sent in a UpdateControl signal. |
| MeanAdmitRate | $\gamma$ | Mean admitted rate computed as a moving geometrically weighted moving average. |
| UpdateInterval | $\delta t$ | The time since the last update. |
| UpdateTime | | The time at which the last update was made. |

TABLE 3

Control parameters used in the SDL definition of closed loop rate control

| Parameter name (SDL) | Notation | Description |
|---|---|---|
| EventCountMax | | Maximum count of events before a mean event rate update is forced (all states). |
| pU | | Geometric coefficient to update the MeanAdmitRate and MeanEventRate using the most recent measurement of AdmitRate and EventRate respectively (UNCONTROLLED state). |
| pC | | Geometric coefficient to update the MeanAdmitRate and MeanEventRate using the most recent measurement of AdmitRate and EventRate respectively (CLOSED2 and CLOSED1 states). |
| UpdateIntervalMax | | Maximum time interval after the last update before an update to the mean admitted and event rates is forced. |
| ControlRateMin | $\mu_{min}$ | The minimum possible restrictor control rate. |
| ControlRateMax | $\mu_{max}$ | The maximum possible restrictor control rate. |
| GoalEventRate | R | The event rate that is the goal (target) to which the control should converge (closed states). |
| AsymptoticCoeff | $\alpha$ | The coefficient multiplying the difference between the GoalRejectRate and the measured MeanEventRate used to update the ControlRate. |
| LowerEventRate | | The event rate which determines transition to the CLOSED1 state. |
| CLOSED1_Duration | | The maximum duration that control can be in the CLOSED1 state. |
| RequestEventRate | | The admitted rate threshold above which event reports are requested. |
| ReqER_CountMax | | The maximum value that the count of admitted requests (ReqER_Count) can reach when in sampling mode in the UNCONTROLLED state. |
| ReqER_IntervalMax | | The length of time since the last Event received which causes sampling of event requests. |

TABLE 4

Variables used in the SDL definition of closed loop rate control

| Variable | Notation | Meaning and Use |
| --- | --- | --- |
| AdmitCount | | Count of requests admitted by the Restrictor. This is reset to 0 each time an update to MeanAdmitRate is performed. |
| AdmitRate | | Average rate of admitted requests since the last update. |
| ControlRate | $\mu$ | The control rate to be applied by the restrictor as sent in a UpdateControl signal. |
| MeanAdmitRate | $\gamma$ | Mean admitted rate computed as a moving geometrically weighted moving average. |
| UpdateTime | | The time at which the last update was made. |
| CLOSED1_EntryTime | | Time of entry into the CLOSED1 state. |
| UpdateInterval | | The length of time since the last update. |
| UpdateTime | | The time at which the last update was made. |
| EventCount | | Count of events received in the EventReport signal. This is reset to 0 each time an update to MeanEventRate is performed. |
| EventRate | | Average rate of events received since the last update. |
| LastEventTime | | The time at which the last Event was received. Used for the Event request sampling method. |
| MeanEventRate | $\omega$ | Mean event rate computed as a moving geometrically weighted moving average. |
| ReqER_Count | | Count of potential event requests. |
| ReqER_CountMaxCurrent | | The value of ReqER_Count that causes an event request to be made (ReqER_State = REQUEST). This is either equal to 1 or to the configurable parameter ReqER_CountMax (see Table 3). |
| ReqER_State | | This variable indicates whether to request an event report (value REQUEST) or not (NO_REQUEST), returned in the ReqER_Resp signal in response to a ReqER_Query signal. |

TABLE 5

Control parameters used in the SDL definition of integrated closed and open loop rate control

| Parameter name (SDL) | Notation | Description |
| --- | --- | --- |
| ArrivalCountMax | | Maximum count of arrivals (both admitted and rejected by control) before a mean admitted rate update is forced. |
| EventCountMax | | Maximum count of events before a mean event rate update is forced (all states). |
| pO | | Geometric updating coefficient in the most recent measurement. |
| pC | | Geometric coefficient to update the MeanAdmitRate and MeanEventRate using the most recent measurement of AdmitRate and EventRate respectively (CLOSED2 and CLOSED1 states). |
| OpenUpdateIntervalMax | | Maximum time interval after the last update before an update to the mean admitted is forced (OPEN state). |
| ClosedUpdateIntervalMax | | Maximum time interval after the last update to the event rate before an update to the mean admitted and event rates is forced. |
| ControlRateMin | | The minimum possible restrictor control rate. |
| ControlRateMax | | The maximum possible restrictor control rate. |
| IncreaseCoeff | c | The coefficient multiplying the time interval since the last update and added to the ControlRate when the update frequency is high. |
| ControlRateCoeff | a | The coefficient multiplying the ControlRate when the update rate is low for slowly varying offered rates. |
| GoalEventRate | R | The event rate that is the goal (target) to which the control should converge (closed states). |
| AsymptoticCoeff | $\alpha$ | The coefficient multiplying the difference between the GoalRejectRate and the measured MeanEventRate used to update the ControlRate. |
| LowerEventRate | | The event rate which determines transition to the CLOSED1 state. |
| CLOSED1_Duration | | The maximum duration that control can be in the CLOSED1 state. |
| RequestEventRate | | The admitted rate threshold above which event reports are requested. |

TABLE 5-continued

Control parameters used in the SDL definition of integrated closed and open loop rate control

| Parameter name (SDL) | Notation | Description |
|---|---|---|
| ReqER_CountMax | | The maximum value that the count of admitted requests (ReqER_Count) can reach when in sampling mode in the UNCONTROLLED state. |
| ReqER_IntervalMax | | The length of time since the last Event received which causes sampling of event requests. |

TABLE 6

Variables used in the SDL definition of integrated closed and open loop rate control

| Variable | Notation | Meaning and use |
|---|---|---|
| AdmitCount | | Count of requests admitted by the Restrictor. This is reset to 0 each time an update to MeanAdmitRate is performed. |
| AdmitRate | | Average rate of admitted requests since the last update. |
| ArrivalCount | | Count of request arrivals (admitted and rejected) to the restrictor. This is reset to 0 each time an update to MeanAdmitRate is performed. |
| ControlRate | $\mu$ | The control rate to be applied by the restrictor as sent in a UpdateControl signal. |
| MeanAdmitRate | $\gamma$ | Mean admitted rate computed as a moving geometrically weighted moving average. |
| OpenUpdateInterval | $\delta t$ | The time since the last update to the admit rate (OPEN state). |
| ClosedUpdateInterval | | The time since the last update to the event rate. |
| OpenUpdateTime | | The time at which the last update was made (OPEN state). |
| ClosedUpdateTime | | The time at which the last update to the event rate was made. |
| CLOSED1_EntryTime | | Time of entry into the CLOSED1 state. |
| UpdateInterval | | The length of time since the last update. |
| UpdateTime | | The time at which the last update was made. |
| EventCount | | Count of events received in the EventReport signal. This is reset to 0 each time an update to MeanEventRate is performed. |
| EventRate | | Average rate of events received since the last update. |
| LastEventTime | | The time at which the last Event was received. Used for the Event request sampling method. |
| MeanEventRate | $\omega$ | Mean event rate computed as a moving geometrically weighted moving average. |
| ReqER_Count | | Count of potential event requests. |
| ReqER_CountMaxCurrent | | The value of ReqER_Count that causes an event request to be made (ReqER_State = REQUEST). This is either equal to 1 or to the configurable parameter ReqER_CountMax (see Table 3). |
| ReqER_State | | This variable indicates whether to request an event report (value REQUEST) or not (NO_REQUEST), returned in the ReqER_Resp signal in response to a ReqER_Query signal. |

References

[1] T W Abernethy and A C Munday, 'Intelligent Networks, standards and services', BT Technology Journal: *Network intelligence*, Vol. 13 No. 2—April 1995.

[2] P M Williams and M J Whitehead, 'Adaptive rate-based controls for generic network overload control', BTTJ paper.

[3] ITU-T, Q.1214: Distributed Functional Plane for Intelligent Network CS-1, §5.4.2 Call Gap Capability, §6.4.2.9 Call Gap; Q.1224: Distributed Functional Plane for Intelligent Network Capability Set 2, §11.4.2 Call gap capability, §12.4.3.12 Call Gap,

[4] 'A method of controlling overload in a telecommunications network', patent application. EP 93309185.2; priority date: 18 Nov. 1993.

Abbreviations

ATM Asynchronous Transfer Mode
CISL Common Intelligence Services Layer
HTTP Hyper Text Transfer Protocol
IDP Initial Detection Point
INAP Intelligent Network Application Protocol
ISUP ISDN User Part
SDL Specification Design Language
SIP Session Initiation Protocol
SSP Service-Switching Point
SCP Service Control Point
SDL (SPECIFICATION DESIGN LANGUAGE) SYMBOLS.

SDL is used informally. Conventional SDL symbols are used, which include:

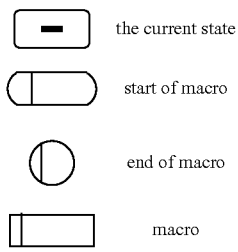

- the current state start of macro end of macro macro

The invention claimed is:

1. A controller including signal processing circuits configured to control the admit rate of messages passed to a node in a communications system according to a control value that sets an upper limit on the average admit rate, the controller comprising:
    a rate adapter control circuit which periodically updates the control value such that the upper limit set by the updated control value is the lesser of (a) an increasing function of the previous upper limit and (b) an increasing function of the previous admit rate; and
    a monitoring circuit that monitors said admit rate at a point of control.

2. A controller as claimed in claim 1 in which an update is performed when the first to be met of two conditions is met, in which the two conditions comprise: a condition that is met when the time since the last update exceeds a predetermined value, and a further condition that is met when the number of message arrivals to the controller reaches a predetermined value.

3. A controller as claimed in claim 1 in which the control value $\mu_{i+1}$ for the next interval is set to:

$$\mu_{i+1} = \min\{f(\gamma_i), g(\mu_i, \delta t)\}$$

where f and g are increasing functions.

4. A controller as claimed in claim 1 in which the control value $\mu_{i+1}$ for the next interval is set to:

$$\mu_{i+1} = \min\{\alpha\gamma_i, \mu_i + c\delta t\}$$

where a is a control rate coefficient, $\gamma_i$ is the previous admit rate, c is an increase coefficient and $\delta t$ is the time period since the previous update.

5. A controller as claimed in claim 1 in which the controller comprises a further controller circuit comprising:
    a rejection monitor circuit that monitors the rate of message rejection by the node to provide a monitored rejection rate;
    an admit monitor circuit that monitors the rate of messages to the node passed by the controller to provide a monitored admit rate; and
    a further rate controller circuit that controls the rate at which messages to the node are passed on the basis of said monitored rejection rate and said monitored admit rate so that the rejection rate tends towards a target value.

6. A controller as claimed in claim 5 in which the further rate controller circuit limits the maximum rate at which the messages are passed to a further control value.

7. A controller as claimed in claim 6 in which the further control value controls the maximum average admit rate.

8. A controller as claimed in claim 6 in which the further control value is calculated relative to the monitored rate of messages passed to the node.

9. A controller as claimed in claim 6 in which the further control value is calculated relative to the monitored rate of messages accepted by the node.

10. A controller as claimed in claim 9 in which the further control value is positive.

11. A controller as claimed in claim 5 in which, if the monitored rejection rate is below the target value, the further control value is increased.

12. A controller as claimed in claim 5 in which, if the monitored rejection rate is above the target value, the further control value is decreased.

13. A controller as claimed in claim 5 in which the rate at which messages to the node are passed is updated periodically.

14. A controller as claimed in claim 13 in which the update period varies with the rate of change in the rate of messages received for the node.

15. A controller as claimed in claim 13 in which the update period varies as a function of the time since the last update and the number of rejects received since the last update.

16. A controller as claimed in claim 5 governed by $$\mu_{i+1} = \max\{\gamma_i + \alpha(R - \omega_i), 0\}, \text{ where}$$

$\gamma_i$ is the rate of messages passed by the controller in a first period;

$\omega_i$ Is the rate of message rejection by the node in the first period;

$\mu_{i+1}$ is the upper limit on the rate of messages passed by the controller in a second period following the first period;

R is a control parameter, which equates to the target value; and $\alpha$ is an asymptotic coefficient.

17. A controller as claimed in claim 1 arranged in use to control the flow of messages in a communication system to more than one node and comprising:
    a rejection monitor circuit that monitors the rate of message rejection by each of the nodes to provide monitored rejection rates for said nodes;
    an admit monitor circuit that monitors the rate of messages to each of the nodes passed by the controller to provide monitored admit rates for said nodes; and
    a further rate controller circuit that controls the rate at which messages to the nodes are passed on the basis for each node of the monitored rejection rate and the monitored admit rate for that node so that the rejection rate for each node tends towards a target value.

18. A controller as claimed in claim 6 in which the further control value is determined by one of the further rate controller circuit and the further controller circuit according to the reject rate.

19. A method of controlling the admit rate of messages passed to a node in a communications system according to a control value that sets an upper limit on the average admit rate, said method comprising:
    using signal processing circuits to periodically update the control value in which the upper limit resulting from the updated control value is the lesser of (a) an increasing function of the previous upper limit and (b) an increasing function of the previous admit rate; and
    communicating via at least one signal communications path said updated control value to a rate controller that controls the admit rate of messages being passed to said node.

20. A method according to claim 19 in which the updated control value is the lesser of an increasing function of the previous control value and the time period since the previous update; and an increasing function of the previous admit rate.

21. A method according to claim 19 including updating the control value when the first to be met of two conditions is met, in which the two conditions comprise: a condition that is met when the time since the last update exceeds a predetermined value, and a further condition that is met when the number of message arrivals to the controller reaches a predetermined value.

22. A method according to claim 19 including controlling the admit rate of messages from a plurality of sources.

* * * * *